US012563471B2

(12) United States Patent     (10) Patent No.:   US 12,563,471 B2
Ghadge et al.                (45) Date of Patent:     Feb. 24, 2026

(54) 4G-5G OPEN RAN USER PLANE PATH

(71) Applicant: Parallel Wireless, Inc., Nashua, NH (US)

(72) Inventors: Amit Ghadge, Pune (IN); Vivek Pise, Pune (IN); Mukesh Singhal, Pune (IN); Praneet Chivate, Nahua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 394 days.

(21) Appl. No.: 17/838,597

(22) Filed: Jun. 13, 2022

(65) Prior Publication Data

US 2022/0400424 A1     Dec. 15, 2022

Related U.S. Application Data

(60) Provisional application No. 63/209,430, filed on Jun. 11, 2021.

(51) Int. Cl.
    H04W 40/02        (2009.01)
    H04L 45/74        (2022.01)
(52) U.S. Cl.
    CPC ............. H04W 40/02 (2013.01); H04L 45/74 (2013.01)
(58) Field of Classification Search
    CPC .................................................... H04W 40/02
    See application file for complete search history.

(56) References Cited

U.S. PATENT DOCUMENTS

| | | | |
|---|---|---|---|
| 11,923,910 B1 * | 3/2024 | Rasmussen .......... | H04B 10/556 |
| 2016/0127169 A1 | 5/2016 | Rosa de Sousa Teixeira et al. | |
| 2018/0376338 A1 | 12/2018 | Ashrafi | |
| 2019/0053301 A1 * | 2/2019 | Hampel ............... | H04W 84/04 |
| 2020/0042365 A1 | 2/2020 | Tanna et al. | |
| 2020/0260427 A1 | 8/2020 | Schefczik et al. | |
| 2022/0369182 A1 * | 11/2022 | Gundavelli ..... | H04W 36/00835 |
| 2023/0055306 A1 | 2/2023 | Ghadge | |
| 2023/0171714 A1 * | 6/2023 | Oh ........................ | H04W 40/18 |
| | | | 370/330 |
| 2023/0199524 A1 | 6/2023 | Singhal | |
| 2023/0370872 A1 | 11/2023 | Singhal et al. | |
| 2023/0370898 A1 * | 11/2023 | Zhu ...................... | H04W 28/16 |
| 2023/0388790 A1 * | 11/2023 | Nakarmi ............. | H04L 63/0478 |

OTHER PUBLICATIONS

5G; NG-RAN; E1 Application Protocol (E1AP) (3GPP TS 38.463 version 16.2.0 Release 16), Jul. 2020.

(Continued)

*Primary Examiner* — Jason E Mattis
(74) *Attorney, Agent, or Firm* — Michael Y. Saji

(57) ABSTRACT

Methods and systems are presented for providing a 4G-5G Open RAN User Plane Path. In one embodiment a method includes keeping, by a Distributed Unit (DU)/Centralized Unit (CU)-User Plane (UP), a list of local switch enabled subscribers; receiving an uplink data packet for a local switch enabled subscriber from a source device; comparing, by the DU/CU-UP, if a destination Internet Protocol (IP) address matches with any of IP addresses in the local switch enabled subscriber destination device IP addresses; and when the destination IP address matches, then switching by the DU/CU-UP the traffic and sending the data packet as a downlink traffic towards the destination device.

18 Claims, 11 Drawing Sheets

Inter-DU switch traffic
from UE-1 to UE-2

(56) References Cited

OTHER PUBLICATIONS

Jack Jia, "Building Unified PaaS Architecture for Agile Development," Apr. 7, 2017, Huawei Technologies Co., Ltd.

"Enterprise Service Bus," Wikipedia, the free encyclopedia, Retrieved Jul. 30, 2018.

Jorg Niemoller, Ioannis Fikouras, Frans De Rooij, Lucas Klostermann, Ulf Stringer, Ulf Olsson, "Ericsson Composition Engine—Next-generation IN," Jan. 2009, Ericsson Review (English Edition).

Falko Menge, "Enterprise Service Bus," Free and Open Source Software Conference 2007.

"Etisalat Transforms BBS With Ericsson," Dec. 18, 2013, Light Reading, an Informa business, trading within KNect365 US, Inc.

Jeffery Vogel, Michael Stricklen, "How Loosely Coupled Architectures are Helping the Modernization of Legacy Software," Oct. 2, 2017, EYGM Limited (Formerly Bulger Partners).

"Loose Coupling," Wikipedia, the free encyclopedia, Retrieved Jul. 30, 2018.

Jurgen Kress, Berthold Maier, Hajo Normann, Danilo Schmeidel, Guido Schmutz, Bernd Trops, Clemens Utschig-Utschig, Torsten Winterberg, "Enterprise Service Bus," Jul. 2013, Oracle Technical Resources (Formerly Oracle Technology Network).

Richard Watson, "How to Architect and Design Cloud-Native Applications," Dec. 29, 2015, Gartner Research, Id G00296114, retrieved from https://www.gartner.com/en/documents/3181919.

"ICT Platform for Digital Communication Providers," Sep. 2, 2015, Ericsson and TIBCO Software, Inc.

"5G NR gNodeB Functional Split : CU DU split", https://www.5g-networks.net/5g-technology/gnodeb-gnb-cu-du-split/, Mar. 31, 2020.

"5G; NG-RAN; Architecture description", (3GPP TS 38.401 version 15.2.0 Release 15), 2018-07.

Gallenmüller et al.: "Comparison of Frameworks for High-Performance Packet IO", 2015 IEEE.

"5G NR Interfaces X2/Xn, S1/NG, F1 and E1 Functions", https://www.techplayon.com/5g-nr-interfaces-x2-xn-s1-ng-f1-and-e1-functions/, May 24, 2019.

* cited by examiner

100

200

700

Downlink Path

Uplink Path

800

4G-5G OPEN RAN USER PLANE PATH

CROSS-REFERENCE TO RELATED APPLICATIONS

This application claims priority under 35 U.S.C. § 119(e) to U.S. Provisional Pat. App. No. 63/209,430, filed Jun. 11, 2021, titled "4G-5G Open RAN User Plane Path" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. Nos. 14/822,839, 15/828,427, U.S. Pat. App. Pub. Nos. US20170273134A1, US20170127409A1 in their entirety.

BACKGROUND

Open RAN is the movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC(RAN Intelligence Controller).

OpenRAN is a flexible and scalable architecture that delivers disaggregation of hardware and software, along with decoupling of CU/DU functionality and support for a 3GPP compliant split. In one embodiment an OpenRAN hardware ecosystem comprises Software Defined Radios (SDRs) that can be software upgraded to 5G for ease of deployment and lower cost, with no rip-and-replace. By separating RAN hardware from software, and by using commoditized GPP-based hardware, we are able drive down cost as a part of an end-to-end solution. This software-based approach delivers ultra-high capacity access with absolutely no capacity or coverage limits and with the ability to cost-effectively extend resources to 5G, edge cloud, and MEC.

SUMMARY

Described herein are embodiments wherein an 4G-5G Open RAN Local Switch User Plane Path Solution provides an enhanced intelligent version of the way User Plane traffic is transported from source to the destination subscriber in a Mobile network when both source and destination subscriber are in the same local network. These described methods help to eliminate the hops in the User Plane path that don't add value to the data traffic and handle local traffic locally. This in turn leads to lower latency, reduced resource needs, lower load on Core network, Backhaul & Midhaul network and lowers TCO (CAPEX & OPEX) for the Operator. These solutions can be valuable for handling peer-to-peer traffic (like private network traffic, satellite backhaul traffic, peer-to-peer gaming traffic, voice/video call traffic, local PBX and others) as well as for both 4G and 5G Mobile networks.

In a first embodiment, a method wherein User Plane traffic is transported from source to the destination subscriber includes keeping, by a Distributed Unit (DU)/Centralized Unit (CU)-User Plane (UP), a list of local switch enabled subscribers; receiving an uplink data packet for a local switch enabled subscriber from a source device; comparing, by the DU/CU-UP, if a destination IP matches with one of the IP in the local switch enabled subscriber destination device IP; and when the destination IP matches, then switching by the DU/CU-UP, the traffic and sending the data packet as a downlink traffic towards the destination device.

In a second embodiment, a method wherein User Plane traffic is transported from source to the destination subscriber includes making a Distributed Unit (DU) terminate an S1-U/N3 Interface towards core; controlling and deciding, by a Centralized Unit (CU)-Control Plane (CP), whether to have Centralized Unit (CU)-User Plane (UP) or not in the data path for a DU or a particular subscriber in that DU; provisioning, by the CU-CP, the DU with the core peer endpoint for S1-U/N3 endpoint; and following, by the DU, the instruction as per the CU-CP whether to send data traffic to CU-UP or to a core peer endpoint.

In another embodiment a system providing a 4G-5G Open RAN User Plane Path includes at least one Distributed Unit (DU); at least one Centralized Unit (CU) in communication with the at least one DU; wherein the CU/DU include a user plane keeping a list of local switch enabled subscribers, wherein the CU/DU receives an uplink data packet for a local switch enabled subscriber from a source device and compare if a destination Internet Protocol (IP) address matches with one of IP addresses in the local switch enabled subscriber destination device IP addresses; and when the destination IP address matches, then by the DU/CU-UP, switches the traffic and sends the data packet as a downlink traffic towards the destination device.

DETAILED DESCRIPTION

Figure 1:
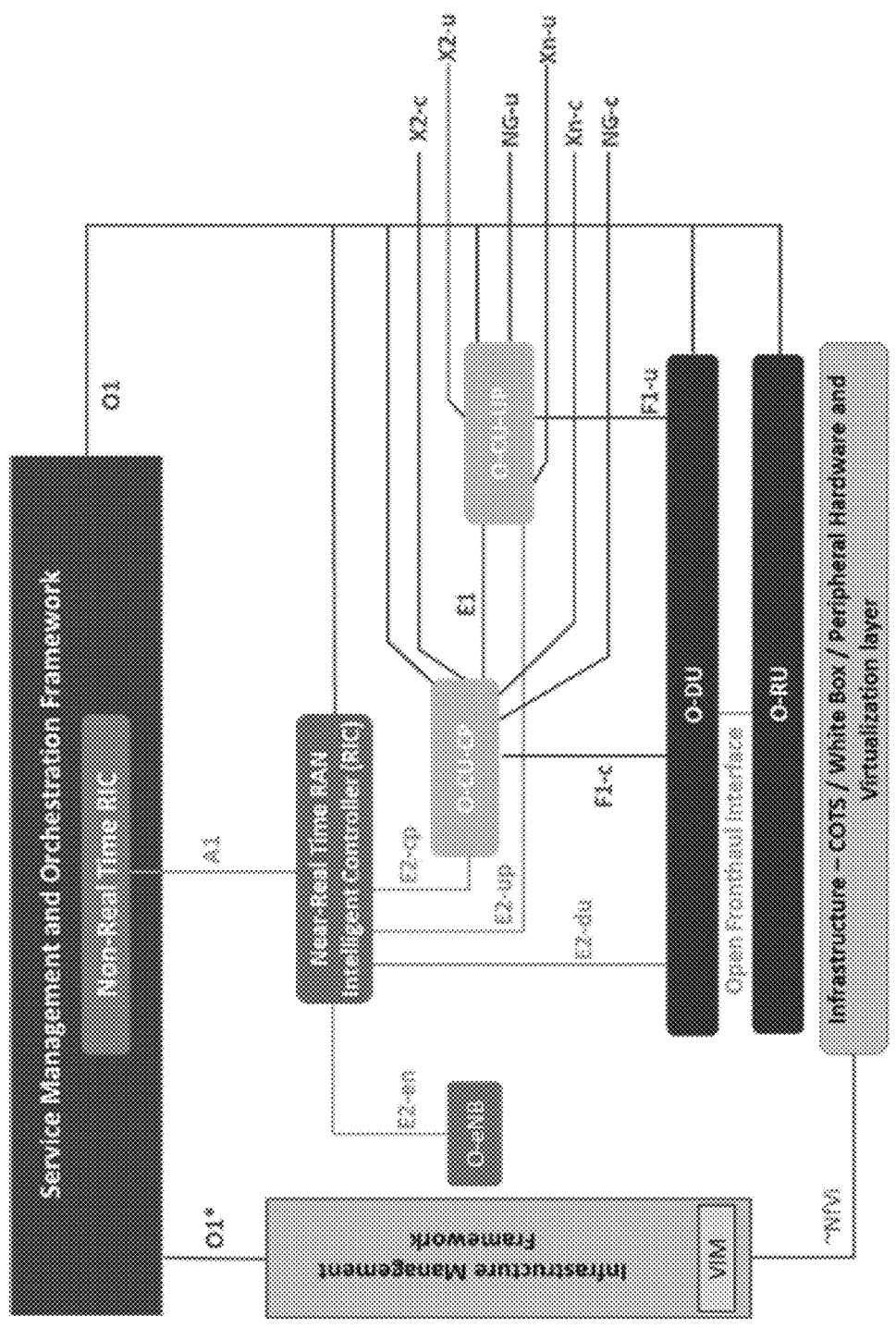
FIG. 1 is a diagram of an Open RAN architecture, in accordance with some embodiments.

FIG. 1 is a diagram the Open RAN architecture 100 as defined by ORAN alliance: The CU function is split into CU-CP (Control Plane) and CU-UP (User Plane) function to provide Control and User Plane separation. Open RAN solution needs to support: Open Interfaces between different functions; Software based functions; Cloud Native functions; Intelligence support via support for xApps/rApps; 3rd Party RRHs; Disaggregated functions; White Box COTS hardware support; and Data Path separated from Control plane traffic.

Control & User plane separation has following advantages: separation helps in having separate Data centers tailored to function needs; and data traffic traverses User Plane Path from RU→DU→CU-UP→Core.

Figure 2:
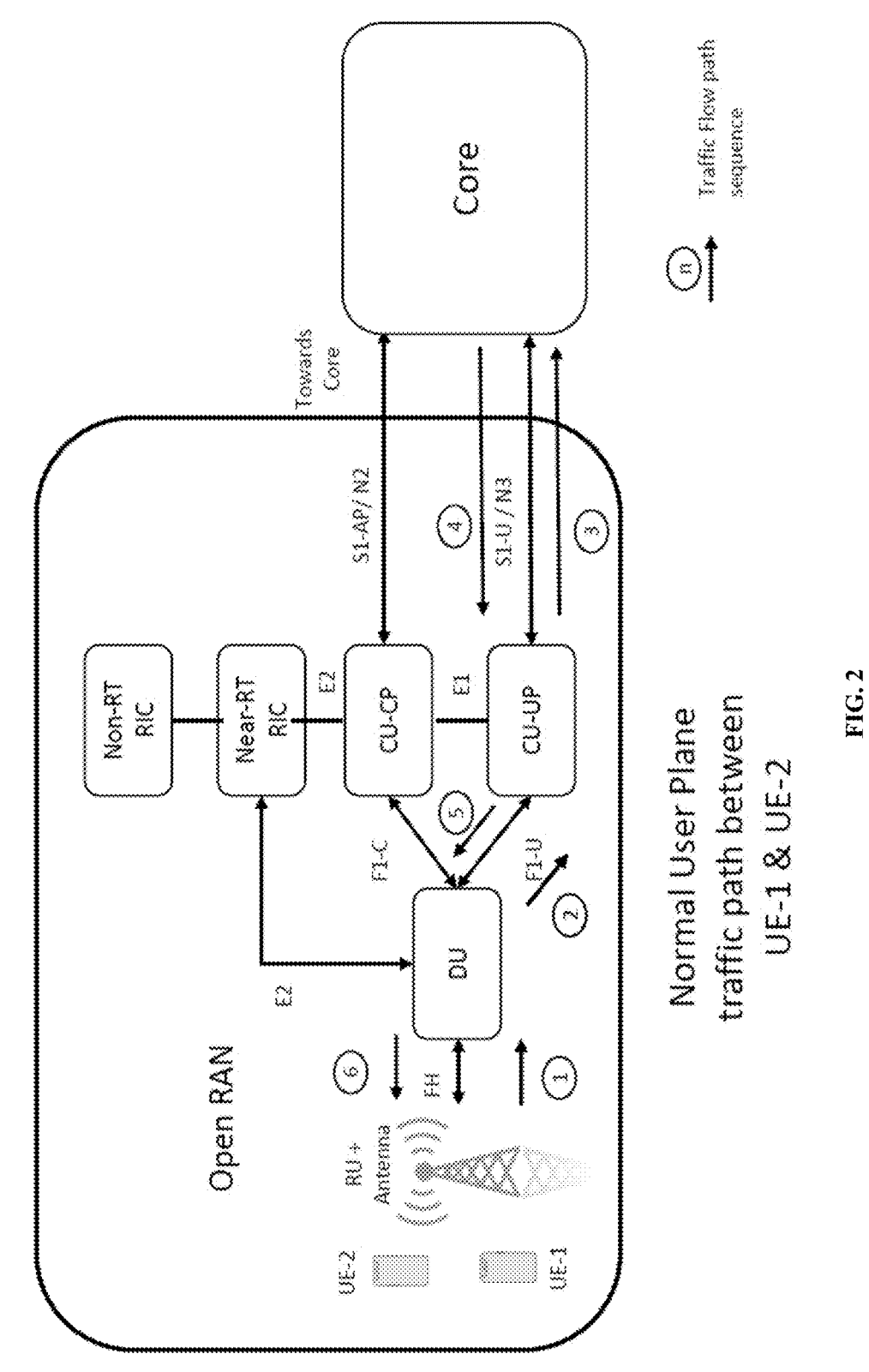
FIG. 2 is a diagram of a path taken by user plane data traffic, in accordance with some embodiments.

FIG. 2 shows a path 200 taken by user plane data traffic normally. User plane traffic either in uplink or downlink passes through both DU & CU-UP function to the Core. Core network then sends it back to the destination by sending it via CU-UP and DU.

With 4G & 5G there is a need to support ultra-low latency use cases or applications. Latency of few milli-seconds is one of the needs for applications like Industrial robotics, eHealth, Autonomous vehicles and so on. In order to do this, it is necessary to reduce the number of hops in the user plane path. More the number of hops in the path higher the latency. With 4G & 5G there is a need to support ultra-low latency use cases or applications. Latency of few milli-seconds is one of the need for applications like Industrial robotics, eHealth, Autonomous vehicles and so on. In order to do this it is necessary to reduce the number of hops in the user plane path. More the number of hops in the path higher the latency.

Another aspect of user plane path is that data traffic is growing in the network exponentially in the network. The more the hops in the user plane path to handle the traffic more the hardware resources needed to host the function and more the CAPEX and OPEX to manage each function in the user plane path. Given the large scale of user plane traffic that a Mobile network would need to handle saving or reduction in number of hops in the user plane path can lead to significantly reduce the latency, reduce the infrastructure resource requirements and TCO (both CAPEX and OPEX).

There is a need for lowest latency possible, lesser number of hops and lesser infra resource consuming path for User plane traffic. Local switching of local traffic at the source can be very beneficial. Local switching handles traffic locally where both source and destination of the traffic is in the same local network. Eliminate the nodes that don't add value to the data traffic path.

In case of no traffic based Charging or flat Charging and no LI (lawful intercept), there is no need to get local traffic to the core network, in many cases.

Solutions to Problem

The 4G/5G Open RAN Local Switch User Plane Path solutions proposed in this submission aims to take the shortest path with lowest number of hop in the User plane path for the local traffic where both source and destination of the traffic is in the same local network.

In some embodiments, local Switch User Plane Path Solution Proposes following solution: locally switch (hairpin) traffic can happen either at DU or between DU's or at CU-UP or between CU-UP's or a mix of them. This feature needs support from Core network, CU-CP, DU and CU-UP; core network along with the help of CU-CP controls and decides the Local switching and where and how to do it. This will be optional capability and can be enabled based on Core, CU & CU capability. Core network is in complete control of this feature and on need basis can convert to/from normal and local switch path. This will help Core network address needs of LI and Charging. Core network informs CU if a Subscriber is local switch enabled and its subscriber IP. In Core network this can be handled by MME/AMF/PGW/SMF. Subscribers profile info shall cover an attribute if this subscriber is eligible for this value-added feature; CU-CP provisions DU/CU-UP with subscribers for whom the local switch is enabled, their subscriber IP addresses & their anchor DU/CU-UP; DU/CU-UP keeps list of local switch enabled subscribers.

On getting the Uplink data packet for a local switch enabled subscriber (UE1) DU/CU-UP compares if destination IP matches with the IP in the local switch enabled subscriber (UE2) IP. If it matches DU/CU-UP local switches the traffic and sends the data packet as a downlink traffic towards UE2. Both source UE (UE1) and destination UE (UE2) should be local switch enabled UE's. Both UE1 & UE2 are catered to by the same DU or CU-UP or different DU or CU-UP. Both UE1 & UE2 are catered to by the same CU-CP. If the traffic doesn't match the local switch criteria it, it is sent via normal path.

For Inter-DU & Inter-CU switch options the traffic is tunneled via an inter-node level Local switch tunnel (could be IP-in-IP or GRE tunnel). For Inter-DU and Inter-CU options to work CU-CP provisions the DU/CU-UP with DU/CU used for the local switch enabled UE respectively. For DU switch option to work it is assumed that DU terminates the S1-U/N3 interface (as proposed in Enhanced User Plane path solution).

CU-CP (based on indication from Core Network) provisions DU/CU-UP with following info about local switch enabled UE: Subscriber IP. DU serving the Subscriber—Needed only if inter-DU switch is used. CU-UP service the Subscriber—Needed only if inter-CU switch is used.

With the solution being proposed there are four different local switch options being proposed. Option used will depend on which DU & CU-UP the source and destination subscriber are served by. Each option is an embodiment, and, each combination thereof is also an embodiment.

Local Switch User Plane Path Option-1

Figure 3:
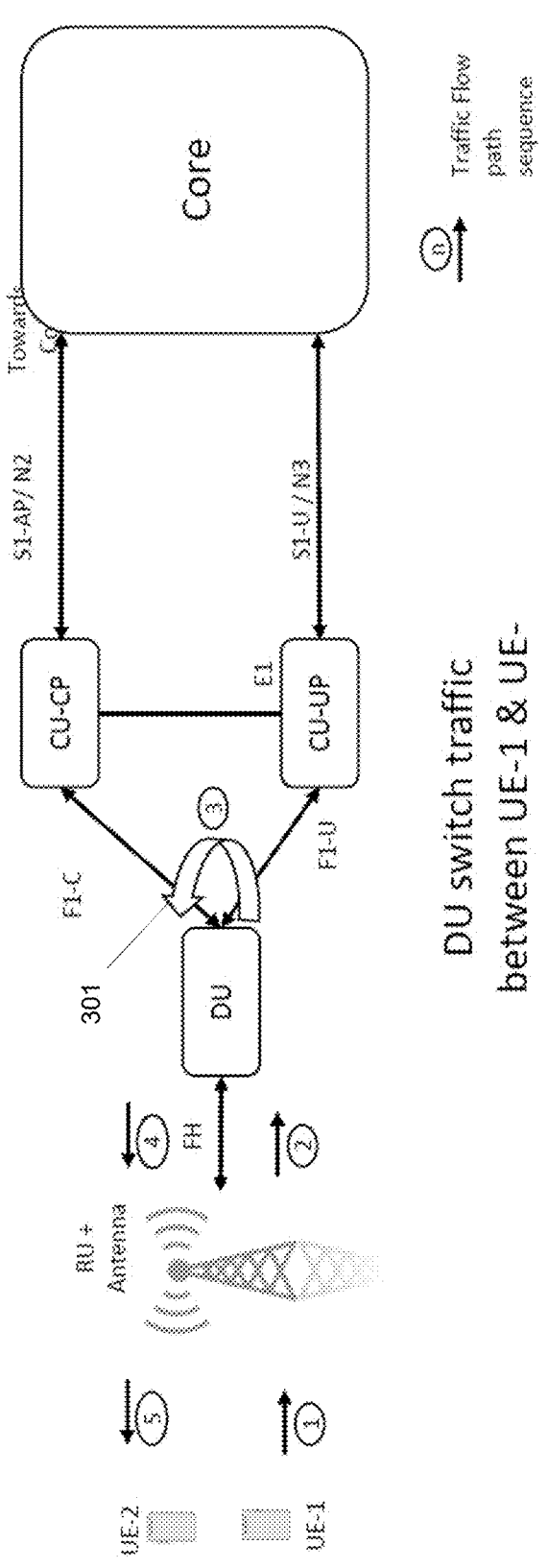
FIG. 3 is a diagram of DU Switch traffic, in accordance with some embodiments.

FIG. 3 shows an DU switch traffic 300, in accordance with some embodiments. One path shown in is the new path 301 introduced by the solution proposed in this option. This Option is used in scenario where both the Subscribers are served by the same DU and are local switch enabled. Local Switch path is optional and selected intelligently by CU-CP/ Core network based on per Subscriber policy and depending on support in DU.

DU keeps list of local switch enabled subscribers. On getting the Uplink data packet for a local switch enabled subscriber (UE1) DU compares if destination IP matches with an the IP in the local switch enabled subscriber (UE2) IP in the same DU. If it matches DU local switches the traffic and sends the data packet as a downlink traffic towards UE2.

Traffic not matching the local switch criteria takes the normal path, in such embodiments.

Local Switch User Plane Path Option-2

Figure 4:
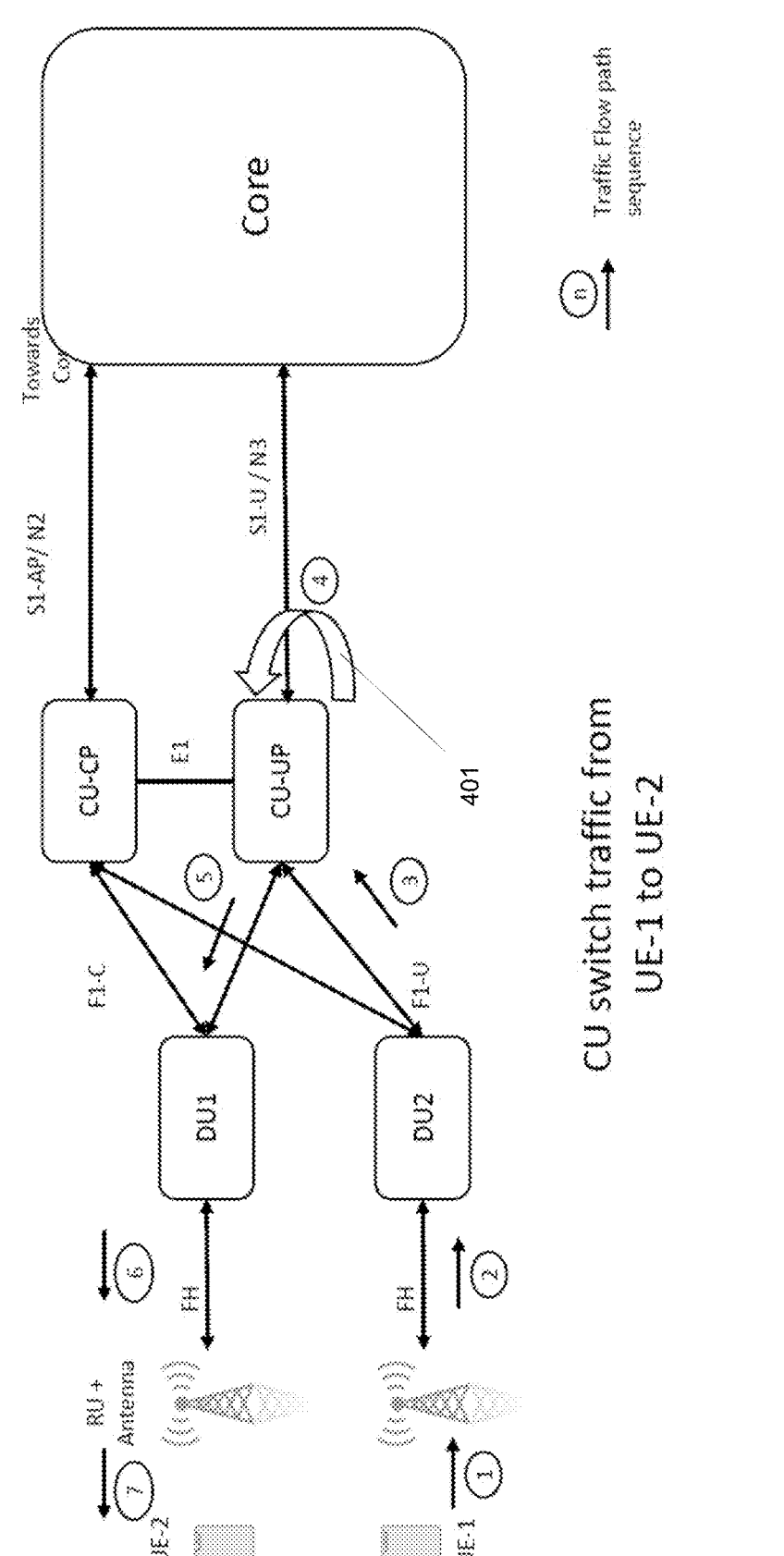
FIG. 4 is a diagram of CU Switch traffic, in accordance with some embodiments.

FIG. 4 shows the Option-1 CU Switch option: 400, in accordance with some embodiments. One path is the new path 401 introduced by the solution proposed in this option. This option is used in scenario where both the Subscribers are served by different DUs but by the same CU-CP & CU-UP and are local switch enabled. Local Switch path is optional and selected intelligently by CU-CP/Core network based on per Subscriber policy and depending on support in CU-UP.

CU-UP keeps list of local switch enabled subscribers. On getting the Uplink data packet for a local switch enabled subscriber (UE1) CU-UP compares if destination IP matches with the IP in the local switch enabled subscriber (UE2) IP in the same CU-UP. If it matches CU-UP local switches the traffic and sends the data packet as a downlink traffic towards UE2.

Traffic not matching the local switch criteria takes the normal path, in such embodiments.

Local Switch User Plane Path Option-3

Figure 5:
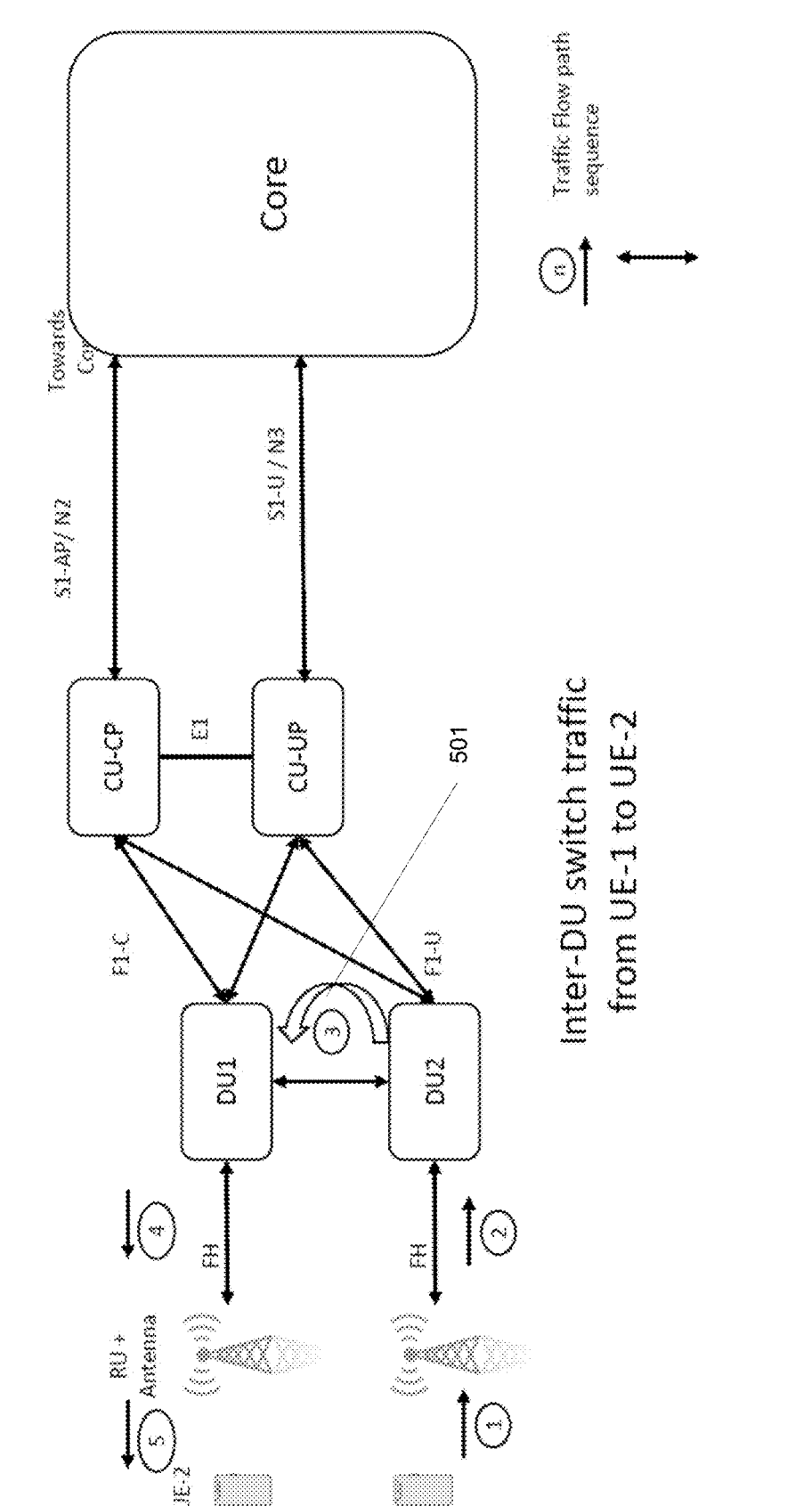
FIG. 5 is a diagram of Inter-DU Switch traffic, in accordance with some embodiments.

FIG. 5 shows an Option-3 Inter-DU Switch option 500, in accordance with some embodiments. One path is the new path 501 introduced by the solution proposed in this option. This Option is used in scenario where both the Subscribers are served by different DUs but by the same CU-CP and are local switch enabled. Local Switch path is optional and selected intelligently by CU-CP/Core network based on per Subscriber policy and depending on support in DU. To transfer the traffic between the DUs an inter-DU Node level Tunnel is created and used to carry the local switch traffic. Inter-Node Tunnel could be an IP-in-IP or GRE or other type of tunnel that carries the IP data packet as is received from the source UE.

DU2 keeps list of local switch enabled subscribers. On getting the Uplink data packet for a local switch enabled subscriber (UE1) DU2 compares if destination IP matches with the IP in the local switch enabled subscriber (UE2) IP and is not in the same DU2 but a different DU. If it matches DU2 local switches the traffic by sending the data packet over inter-Node Tunnel to the DU1, which serves the UE2, and DU1 then sends received data traffic which matches the subscriber IP of UE2. The received data packet is then sent as a downlink traffic towards UE2.

Traffic not matching the local switch criteria takes the normal path, in such embodiments.

Local Switch User Plane Path Option-4

Figure 6:
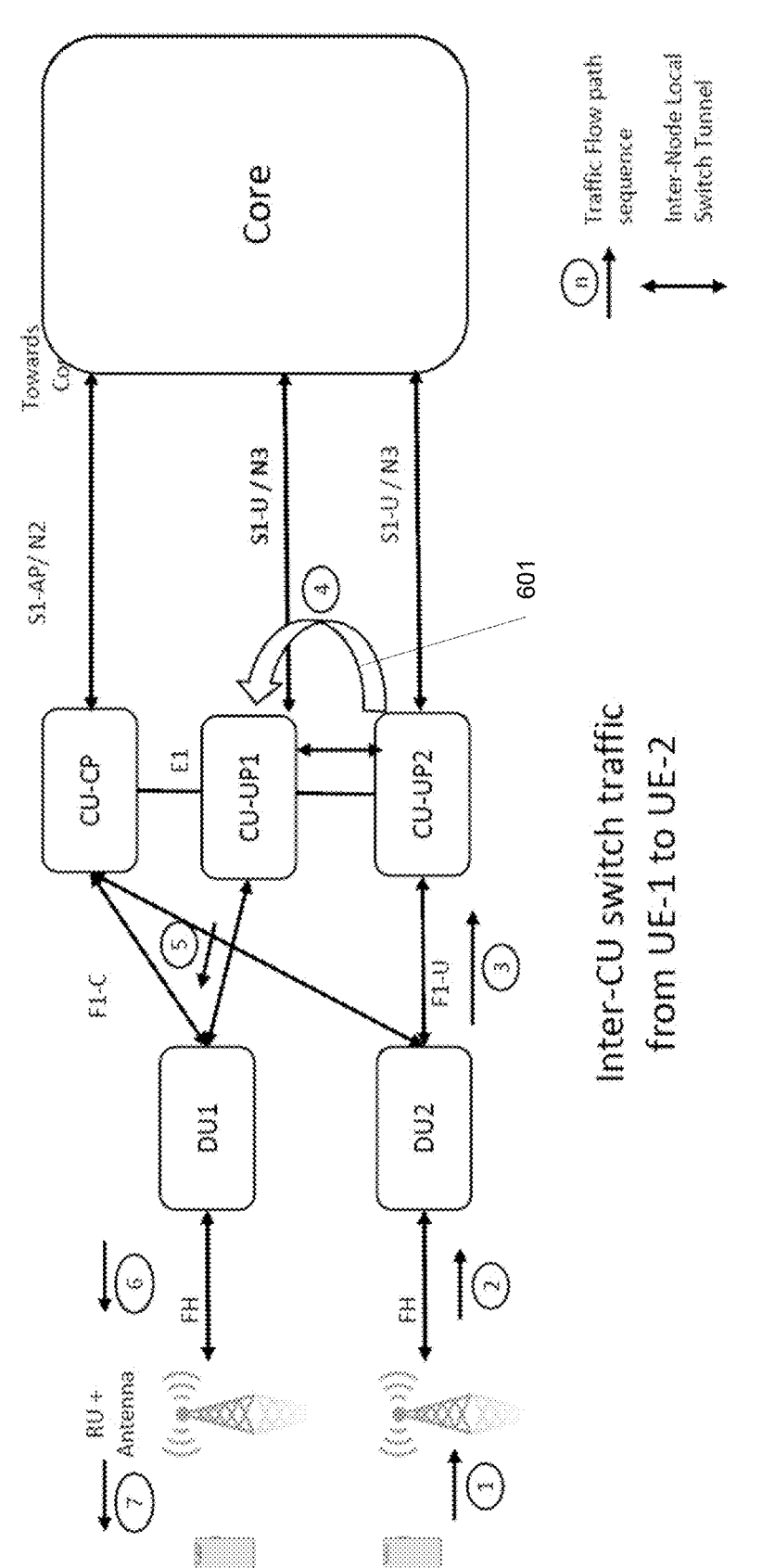
FIG. 6 is a diagram of Inter-CU Switch traffic, in accordance with some embodiments.

FIG. 6 shows an Option-3 Inter-CU Switch option 600, in accordance with some embodiments. One path is the new path 601 introduced by the solution proposed in this option. This Option is used in scenario where both the Subscribers are served by different DUs & different CU-UPs but by the same CU-CP and are local switch enabled. Local Switch path is optional and selected intelligently by CU-CP/Core network based on per Subscriber policy and depending on support in CU-UP. To transfer the traffic between the CU-UPs an inter-CU-UP Node level Tunnel is created and used to carry the local switch traffic. Inter-Node Tunnel could be an IP-in-IP or GRE or other type of tunnel that carries the IP data packet as is received from the source UE.

CU-UP2 keeps list of local switch enabled subscribers. On getting the Uplink data packet for a local switch enabled subscriber (UE1) CU-UP2 compares if destination IP matches with the IP in the local switch enabled subscriber (UE2) IP and is not in the same CU-UP2 but a different CU-UP. If it matches CU-UP2 local switches the traffic by sending the data packet over inter-Node Tunnel to the CU-UP1, which serves the UE2, and CU-UP1 then sends received data traffic which matches the subscriber IP of UE2. The received data packet is then sent as a downlink traffic towards UE2.

Traffic not matching the local switch criteria takes the normal path, in such embodiments.

The solution proposed is an extension to the current standards. Solution proposed has both pros and cons associated with and thus extends the standards as proposed in 3GPP & ORAN.

Advantages of the proposed Local Switch User Plane Path solution, in accordance with some embodiments, are: Local switches the local traffic at the node closest to the source. Reduces number of hops in the User Plane Path for local switched traffic. Reduces traffic load on Core Network, Backhaul and Midhaul. Support for 4G/5G Mobile network. Improves Data path latency. CU-CP & Core can intelligently select Local Switch User Plane path per subscriber basis. Reduces/Optimizes resource needs for the solution. Reduces management overhead by having to eliminate the need for eliminated hops. Minimal impact on Core network. Most of the changes needed in CU and DU. Let's Core to dynamically convert to/from between normal and local switched User plan path as per the LI and charging needs.

Architecture Diagram

There are four different local switch path options proposed and architecture and path proposed are explained in earlier sections.

Alternate Embodiments

Following are some of the alternate embodiments that have been considered, features of which can be combined with one or more of the preceding embodiments to create a new embodiment: RAN network can pass the stats of the locally switched traffic to the Core network so that Core can use it for further processing like charging or analytics. Further embodiments may adjust the number of Inter-Node Data traffic tunnels on an offline, dynamic, or as-needed basis. This will help to reduce the number of inter-Node Data traffic Tunnels. One of the ways to do this could be to use CU-UP as a Tunnel aggregator for Inter-DU Node Data traffic Tunnels. For Inter-CU-UP switch option an external Tunnel aggregator could be introduced for Inter-CU Node Data traffic Tunnels. Further embodiments would introduce local switch between subscribers catered to by different CU-CP. This will expand the scope of the solution to a broader network. For this Inter-CU-CP communication by means of X2/Xn interface can be used.

Another embodiment includes a 4G-5G Open RAN enhanced user plane path. 4G-5G Open RAN Enhanced User Plane Path Solution proposes an enhanced intelligent version of the way User Plane traffic is transported from RAN to Core network of Mobile network. This solution helps to intelligently reduce the number of hops in the User Plane path. This in turn leads to lower latency, reduced resource needs and lowers TCO (CAPEX & OPEX) for the Operator. This solution can be valuable for URLLC & eMBB applications for both 4G as well as 5G Mobile networks.

Control & User plane separation has following advantages: Separation helps in having separate Data centers tailored to function needs. Data traffic traverses User Plane Path from RU→DU→CU-UP→Core.

CU-CP function handles the control plane traffic and CU-UP function handles the user plane data traffic. CU-UP function has following advantages: Aggregates User Plane traffic from several DU's and abstract number of S1-U/N3 peers from Core. DU changes due to handover are masked from the Core. Helps keep DU unaware of Core details.

User plane traffic either in uplink or downlink passes through both DU & CU-UP function. CU-UP function relays the traffic between DU and the Core network and no user plane traffic processing is done by CU-UP.

In another embodiment, a 4G/5G Open RAN Enhanced User Plane Path solution is proposed to reduce the number of hops in the User plane path in order to get the advantages with reducing the number of hops in the user plane path as explained earlier.

Enhanced User Plan Path solution Proposes following solution: Make CU-UP an optional function in the solution. Make DU terminate S1-UN3 Interface towards Core (central or edge). CU-CP controls and decides whether to have CU-UP or not in the data path for a DU or a particular subscriber in that DU. CU-CP provisions DU with the Core Peer endpoint for S1-U/N3 endpoint. DU follows the instruction as per CU-CP whether to send data traffic to CU-UP or to a Core Peer endpoint.

Figure 7:
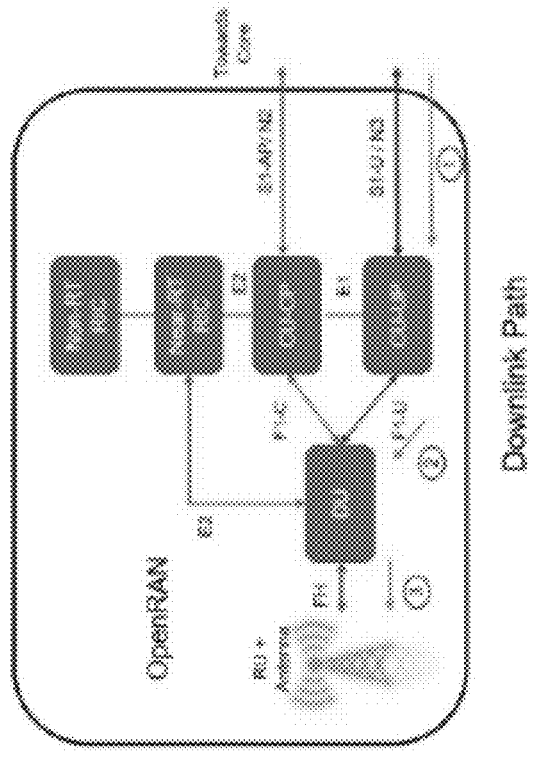
FIG. 7 is a diagram of an enhanced User Plane path, in accordance with some embodiments.
Figure 7:
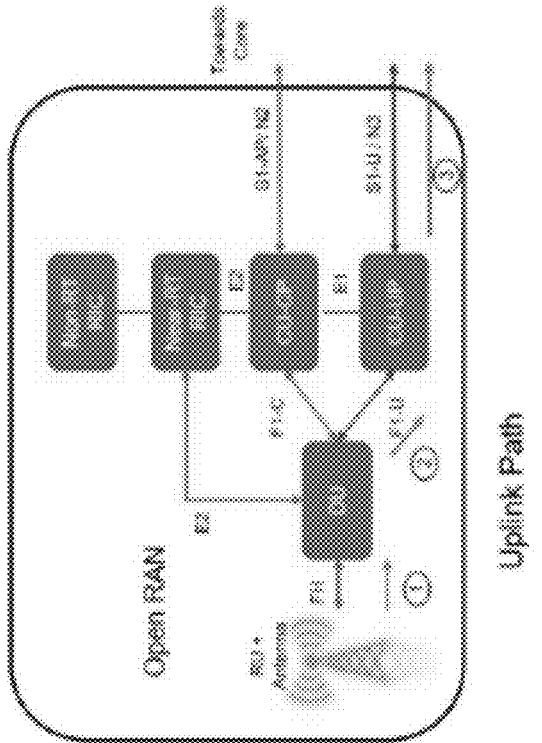

With the solution being proposed the new enhanced User Plane path 700 is shown in FIG. 7, in accordance with some embodiments. One path is the new path introduced by the solution proposed in this embodiment. Again as mentioned earlier enhanced path is optional and selected intelligently by CU-CP based per DU peer policy basis or on a per UE or group of UE based policies defined in CU-CP or could be provisioned by Near-RT RIC.

Solution proposed is beyond standards. Solution proposed has both pros and cons associated with and thus extends the standards as proposed in 3GPP & ORAN.

Advantages of the proposed Enhanced User Plane Path solution are: Makes CU-UP optional. So, if for a scenario you need CU-UP, CU-CP can include it selectively. Support for both 4G & 5G RAN. Eliminates another hop in the Data path. Improves Data path latency. CU-CP can intelligently select Enhanced User Plane path on per DU or per subscriber basis. Reduces/Optimizes resource needs for the solution. Even for Edge Compute/Local breakout it will optimize resources. Reduces management overhead by having to eliminate the need for one function. Core/RU won't need changes for this other than the need for Core to support several S1-U/N3 peers.

Disadvantages of the proposed Enhanced User Plane Path solution are: Each DU will now communicate directly with Core. This could increase the number of S1-U/N3 peers for Core. Handover between DUs for a call will lead to update towards Core. This will increase signaling a bit towards Core. Both CU and DU will need support for this solution to interoperate.

Architecture Diagram

Figure 8:
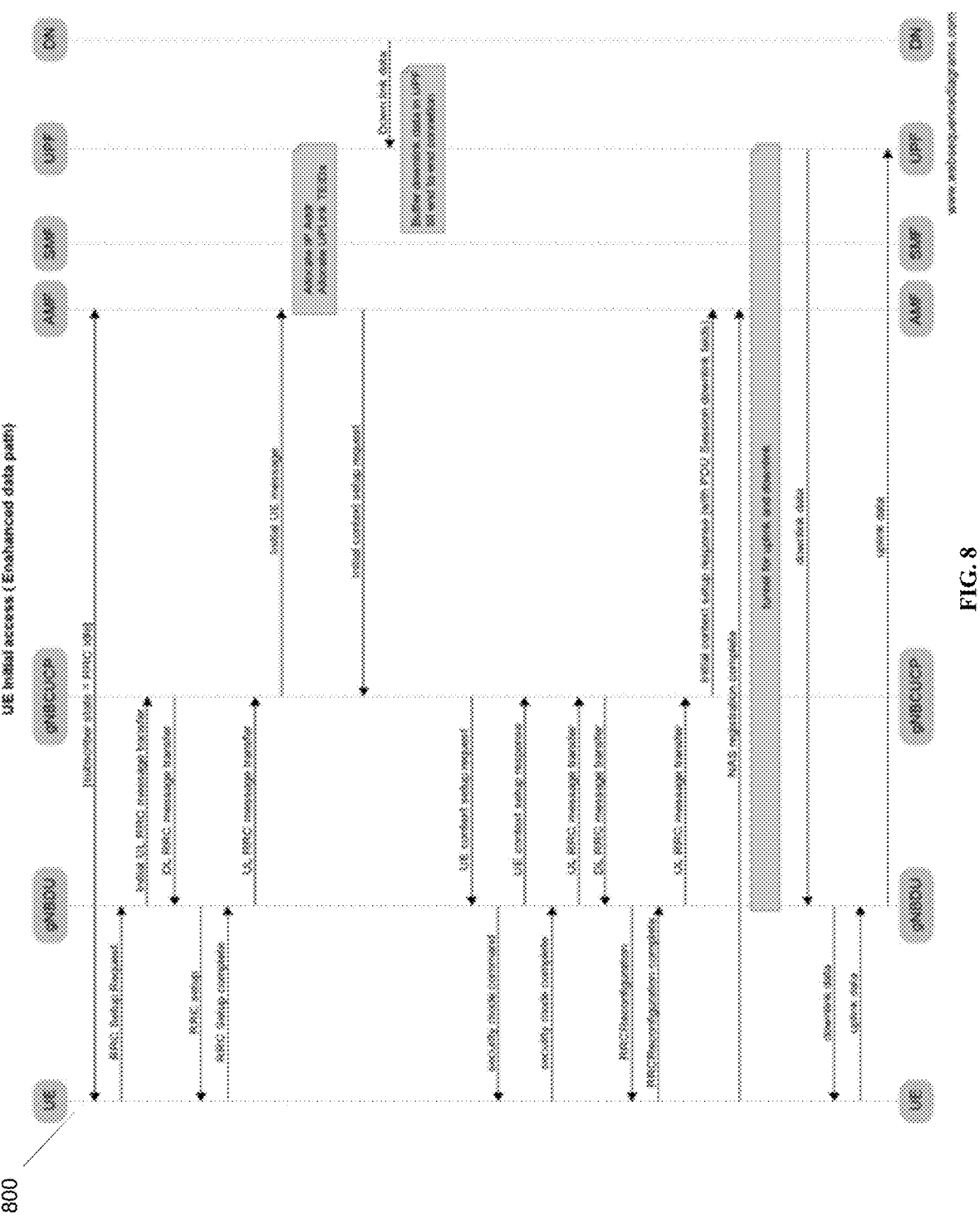
FIG. 8 is a call flow diagram for an initial attach, in accordance with some embodiments.

FIG. 8 shows an example call flow 800, for initial attach.

Figure 9:
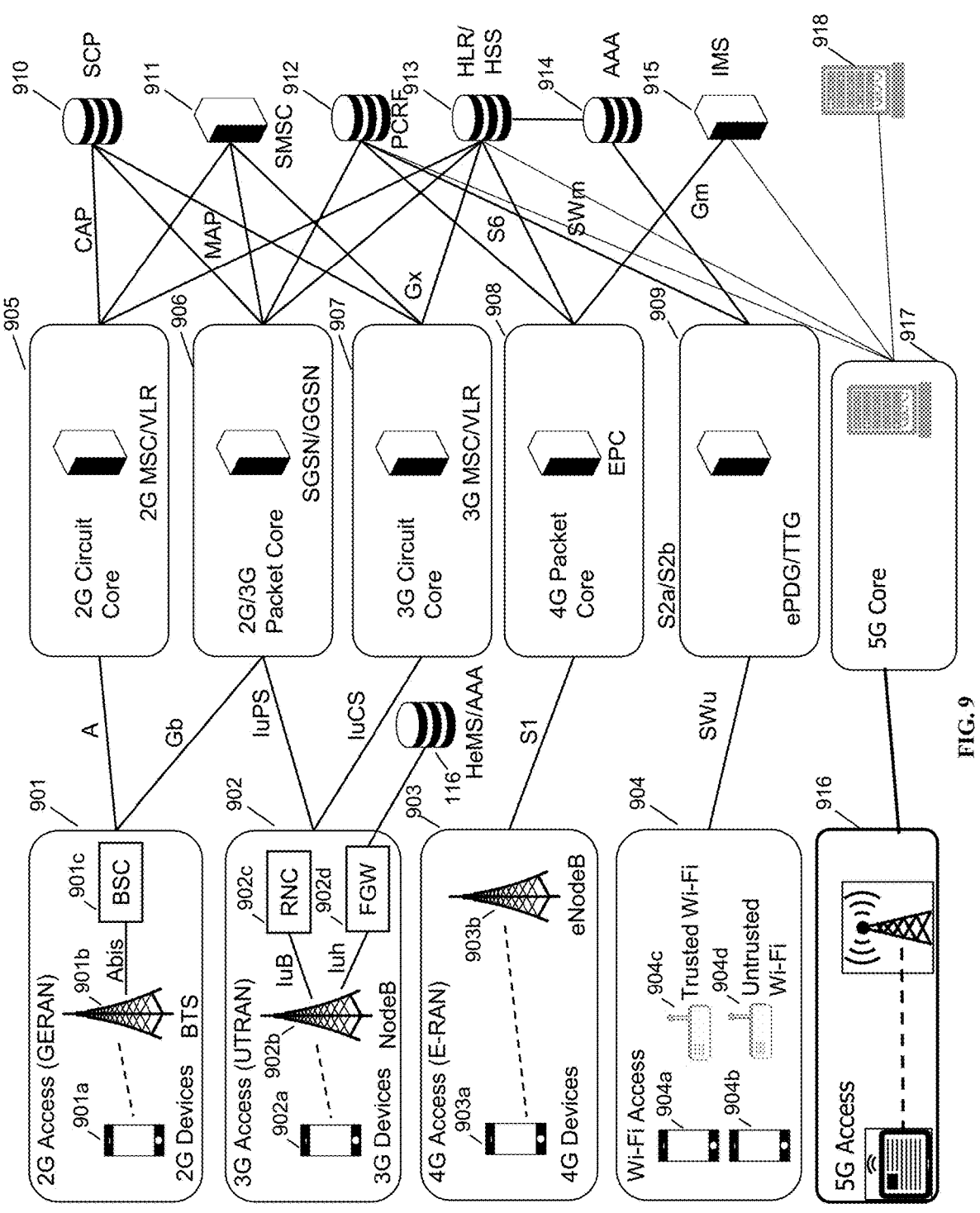
FIG. 9 is a schematic network architecture diagram for 3G and other-G prior art networks.

FIG. 9 shows a schematic network architecture diagram for 3G and other-G prior art networks. The diagram shows a plurality of "Gs," including 2G, 3G, 4G, 5G and Wi-Fi. 2G is represented by GERAN 901, which includes a 2G device 901a, BTS 901b, and BSC 901c. 3G is represented by UTRAN 902, which includes a 3G UE 902a, nodeB 902b, RNC 902c, and femto gateway (FGW, which in 3GPP namespace is also known as a Home nodeB Gateway or HNBGW) 902d. 4G is represented by EUTRAN or E-RAN 903, which includes an LTE UE 903a and LTE eNodeB 903b. Wi-Fi is represented by Wi-Fi access network 904, which includes a trusted Wi-Fi access point 904c and an untrusted Wi-Fi access point 904d. The Wi-Fi devices 904a and 904b may access either AP 904c or 904d. In the current network architecture, each "G" has a core network. 2G circuit core network 905 includes a 2G MSC/VLR; 2G/3G packet core network 906 includes an SGSN/GGSN (for EDGE or UMTS packet traffic); 3G circuit core 907 includes a 3G MSC/VLR; 4G circuit core 908 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 930, the SMSC 931, PCRF 932, HLR/HSS 933, Authentication, Authorization, and Accounting server (AAA) 934, and IP Multimedia Subsystem (IMS) 935. An HeMS/AAA 936 is present in some cases for use by the 3G UTRAN. The diagram is used to indicate schematically the basic functions of each network as known to one of skill in the art, and is not intended to be exhaustive. For example, 5G core 917 is shown using a single interface to 5G access 916, although in some cases 5G access can be supported using dual connectivity or via a non-standalone deployment architecture.

Noteworthy is that the RANs 901, 902, 903, 904 and 936 rely on specialized core networks 905, 906, 907, 908, 909, 937 but share essential management databases 930, 931, 932, 933, 934, 935, 938. More specifically, for the 2G GERAN, a BSC 901c is required for Abis compatibility with BTS 901b, while for the 3G UTRAN, an RNC 902c is required for Iub compatibility and an FGW 902d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size.

Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 10:
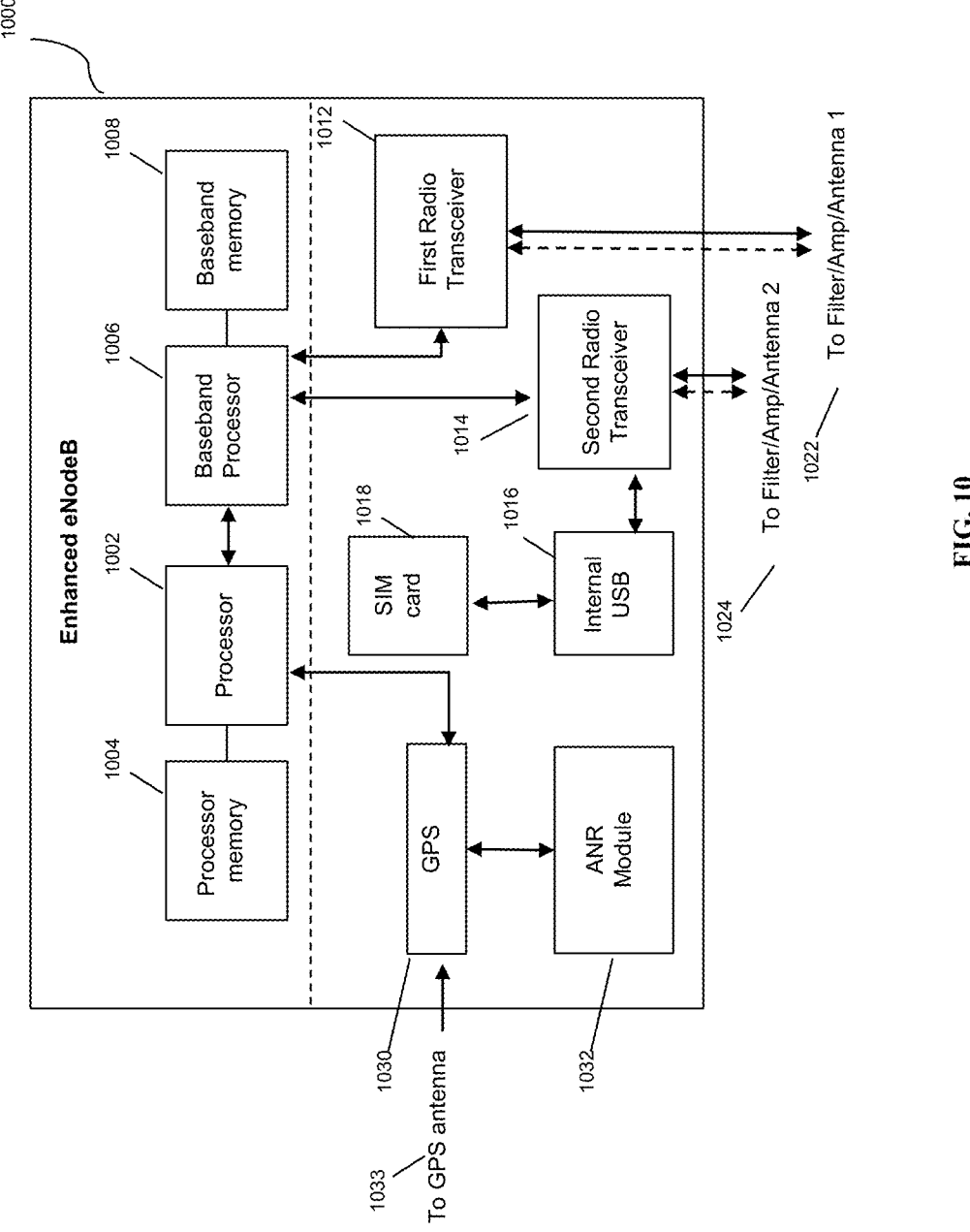
FIG. 10 is an enhanced eNodeB for performing the methods described herein, in accordance with some embodiments.

FIG. 10 is a block diagram showing an enhanced eNodeB for performing the methods described herein, in accordance with some embodiments. eNodeB 500 may include processor 1002, processor memory 1004 in communication with the processor, baseband processor 1006, and baseband processor memory 1008 in communication with the baseband processor. Mesh network node 1000 may also include first radio transceiver 1012 and second radio transceiver 1014, internal universal serial bus (USB) port 1016, and subscriber information module card (SIM card) 1018 coupled to USB port 1016. In some embodiments, the second radio transceiver 1014 itself may be coupled to USB port 1016, and communications from the baseband processor may be passed through USB port 1016. The second radio transceiver may be used for wirelessly backhauling eNodeB 1000.

Processor 1002 and baseband processor 1006 are in communication with one another. Processor 1002 may perform routing functions, and may determine if/when a switch in network configuration is needed. Baseband processor 1006 may generate and receive radio signals for both radio transceivers 1012 and 1014, based on instructions from processor 1002. In some embodiments, processors 1002 and 1006 may be on the same physical logic board. In other embodiments, they may be on separate logic boards.

Processor 1002 may identify the appropriate network configuration, and may perform routing of packets from one network interface to another accordingly. Processor 1002 may use memory 1004, in particular to store a routing table to be used for routing packets. Baseband processor 1006 may perform operations to generate the radio frequency signals for transmission or retransmission by both transceivers 1010 and 1012. Baseband processor 1006 may also perform operations to decode signals received by transceivers 1012 and 1014. Baseband processor 1006 may use memory 1008 to perform these tasks.

The first radio transceiver 1012 may be a radio transceiver capable of providing LTE eNodeB functionality, and may be capable of higher power and multi-channel OFDMA. The second radio transceiver 1014 may be a radio transceiver capable of providing LTE UE functionality. Both transceivers 1012 and 1014 may be capable of receiving and transmitting on one or more LTE bands. In some embodiments, either or both of transceivers 1012 and 1014 may be capable of providing both LTE eNodeB and LTE UE functionality. Transceiver 1012 may be coupled to processor 1002 via a Peripheral Component Interconnect-Express (PCI-E) bus, and/or via a daughtercard. As transceiver 1014 is for providing LTE UE functionality, in effect emulating a user equipment, it may be connected via the same or different PCI-E bus, or by a USB bus, and may also be coupled to SIM card 1018. First transceiver 1012 may be coupled to first radio frequency (RF) chain (filter, amplifier, antenna) 1022, and second transceiver 1014 may be coupled to second RF chain (filter, amplifier, antenna) 1024.

SIM card 1018 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1000 is not an ordinary UE but instead is a special UE for providing backhaul to device 1000.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1012 and 1014, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 1002 for reconfiguration.

A GPS module 1030 may also be included, and may be in communication with a GPS antenna 1032 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 1032 may also be present and may run on processor 1002 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 11:
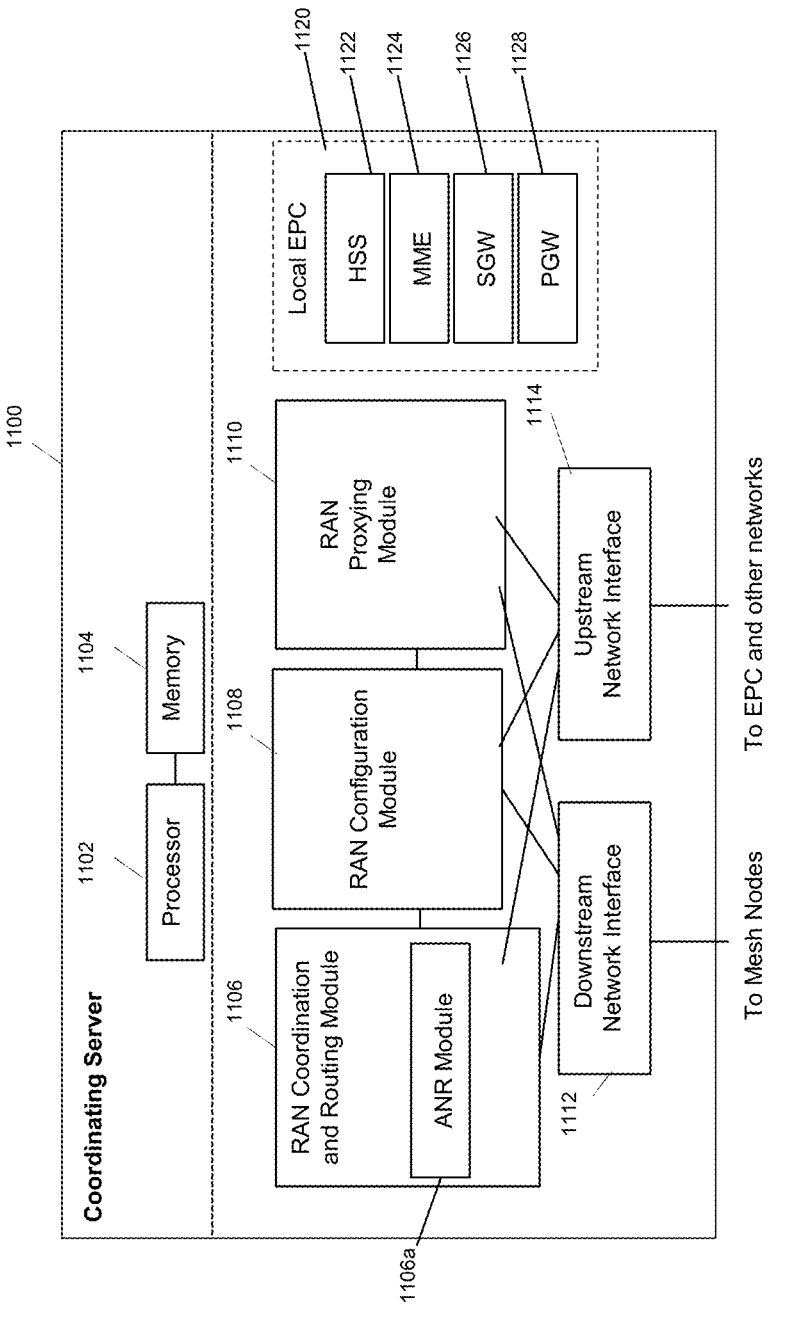
FIG. 11 is a coordinating server for providing services and performing methods as described herein, in accordance with some embodiments.

FIG. 11 shows a block diagram of a coordinating server for providing services and performing methods as described herein, in accordance with some embodiments. Coordinating server 1100 includes processor 1102 and memory 1104, which are configured to provide the functions described herein. Also present are radio access network coordination/routing (RAN Coordination and routing) module 1106, including ANR module 1106a, RAN configuration module 1108, and RAN proxying module 1110. The ANR module 1106a may perform the ANR tracking, PCI disambiguation, ECGI requesting, and GPS coalescing and tracking as described herein, in coordination with RAN coordination module 1106 (e.g., for requesting ECGIs, etc.). In some embodiments, coordinating server 1100 may coordinate multiple RANs using coordination module 1106. In some embodiments, coordination server may also provide proxying, routing virtualization and RAN virtualization, via modules 1110 and 1108. In some embodiments, a downstream network interface 1112 is provided for interfacing with the RANs, which may be a radio interface (e.g., LTE), and an upstream network interface 1114 is provided for interfacing with the core network, which may be either a radio interface (e.g., LTE) or a wired interface (e.g., Ethernet).

Coordinator 1100 includes local evolved packet core (EPC) module 1120, for authenticating users, storing and caching priority profile information, and performing other EPC-dependent functions when no backhaul link is available. Local EPC 1120 may include local HSS 1122, local MME 1124, local SGW 1126, and local PGW 1128, as well as other modules. Local EPC 1120 may incorporate these modules as software modules, processes, or containers. Local EPC 1120 may alternatively incorporate these modules as a small number of monolithic software processes. Modules 1106, 1108, 1110 and local EPC 1120 may each run on processor 1102 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders, as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method, comprising:
keeping, by a Distributed Unit (DU)/Centralized Unit (CU)-User Plane (UP), a list of local switch enabled subscribers;
receiving an uplink data packet for a local switch enabled subscriber from a source device;
comparing, by the DU/CU-UP, if a destination Internet Protocol (IP) address for the uplink data packet matches with any of IP addresses in a list of local switch enabled subscriber destination device IP addresses; and
when the destination IP address matches, then switching by the DU/CU-UP, traffic and sending the uplink data packet as a downlink traffic towards the destination device.

2. The method of claim 1 wherein the DU and the CU provide support for a 4G/5G Mobile network.

3. The method of claim 1 wherein the both the source device and the destination device are local switch enabled devices.

4. The method of claim 1 wherein when the traffic does not match local switch criteria, the traffic is sent via normal path.

5. A method, comprising:
making a Distributed Unit (DU) terminate an interface towards a core;
controlling and deciding, by a Centralized Unit (CU)-Control Plane (CP), whether to have a Centralized Unit (CU)-User Plane (UP) or not in a data path for the DU or a particular subscriber in that DU;
provisioning, by the CU-CP, the DU with a core peer endpoint for an endpoint; and
following, by the DU, an instruction as per the CU-CP whether to send data traffic to the CU-UP or to the core peer endpoint.

6. The method of claim 5 wherein the DU and the CU provide support for a 4G/5G Mobile network.

7. The method of claim 5, wherein the interface is a S1-U/N3 interface.

8. The method of claim 5, wherein the endpoint is a S1-U/N3 endpoint.

9. A system for providing a 4G-5G Open RAN User Plane Path comprising:
at least one Distributed Unit (DU); and
at least one Centralized Unit (CU) in communication with the at least one DU,
wherein the CU/DU includes a user plane keeping a list of local switch enabled subscribers;
wherein the CU/DU receives an uplink data packet for a local switch enabled subscriber from a source device and compare if a destination Internet Protocol (IP) address of the uplink data packet matches with any of a list of IP addresses for any of the list of local switch enabled subscribers; and
wherein when the destination IP address matches, then the DU/CU-UP switches traffic and sends the data packet as a downlink traffic towards the destination device.

10. The system of claim 9 wherein the DU and the CU provide support for a 4G/5G Mobile network.

11. The system of claim 9 wherein the both the source device and the destination device are local switch enabled devices.

12. The system of claim 9 wherein when the traffic does not match local switch criteria, the traffic is sent via a normal path.

13. The system of claim 9 wherein the DU terminate an interface towards a core.

14. The system of claim 9 wherein the CU-CP control and decide whether to have a Centralized Unit (CU)-User Plane (UP) or not in a data path for the DU or a particular subscriber in that DU.

15. The system of claim 14 wherein the CU-CP, provisions the DU with a core peer endpoint for an endpoint.

16. The system of claim 15 wherein the DU follows an instruction as per the CU-CP whether to send data traffic to CU-UP or to a core peer endpoint.

17. The system of claim 16 wherein the interface is a S1-U/N3 interface.

18. The system of claim 16 wherein the endpoint is a S1-U/N3 endpoint.

* * * * *